(12) United States Patent
Feng et al.

(10) Patent No.: US 11,330,322 B2
(45) Date of Patent: *May 10, 2022

(54) MULTIMEDIA BULLET SCREEN ON TV VIA REMOTE CONTROL INPUT DEVICE AND SET TOP BOX

(71) Applicant: ARRIS Enterprises LLC, Suwanee, GA (US)

(72) Inventors: Halting Feng, Shanghai (CN); Biao Liu, Shanghai (CN); Xuewei Zhao, Shanghai (CN); Qiang Huang, Shanghai (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/150,157

(22) Filed: Jan. 15, 2021

(65) Prior Publication Data

US 2021/0136442 A1    May 6, 2021

Related U.S. Application Data

(63) Continuation of application No. 15/736,359, filed as application No. PCT/CN2017/102097 on Sep. 18, 2017, now Pat. No. 10,917,681.

(51) Int. Cl.
*H04N 21/422*   (2011.01)
*G10L 15/22*    (2006.01)
(Continued)

(52) U.S. Cl.
CPC ....... *H04N 21/42222* (2013.01); *G10L 13/00* (2013.01); *G10L 15/22* (2013.01);
(Continued)

(58) Field of Classification Search
CPC ....... H04N 21/42222; H04N 21/42203; H04N 21/4788; H04N 21/6118; H04N 21/4312;
(Continued)

(56) References Cited

U.S. PATENT DOCUMENTS 8,032,383 B1 * 10/2011 Bhardwaj ............... G10L 21/06
2003/0182663 A1 * 9/2003 Gudorf .................. H04N 7/173
(Continued)

FOREIGN PATENT DOCUMENTS

CN    103997688    8/2014
CN    104618806    5/2015
(Continued)

OTHER PUBLICATIONS

Notification of Reasons for Rejection dated Apr. 13, 2021 in JP Patent Application No. 2020-511958 with English translation.
(Continued)

*Primary Examiner* — Anthony Bantamoi
(74) *Attorney, Agent, or Firm* — Wenderoth, Lind & Ponack, L.L.P.

(57) ABSTRACT

The example system and method enable a user to post comments to appear as textual content in a streaming graphical content presentation. The textual content and the graphical content may be provided to the user's set top box for presentation on an associated display device and may be provided to another user's set top box for presentation on the other user's display device. Each of the users utilize a wireless remote control enabled to accept text and/or voice inputs of a comment for inclusion in the streaming graphical content. The set top box generates a comment based on the inputted text and/or voice received from the remote control. The set top box provides the generated comment to a media server which distributes textual content based on the gen-
(Continued)

erated comment to other set top boxes for presentation with the streaming graphical content.

18 Claims, 7 Drawing Sheets

(51) Int. Cl.
  *G10L 15/30* (2013.01)
  *H04N 21/431* (2011.01)
  *H04N 21/4788* (2011.01)
  *H04N 21/61* (2011.01)
  *G10L 13/00* (2006.01)
  *G10L 15/26* (2006.01)

(52) U.S. Cl.
  CPC .............. *G10L 15/26* (2013.01); *G10L 15/30* (2013.01); *H04N 21/42203* (2013.01); *H04N 21/4312* (2013.01); *H04N 21/4788* (2013.01); *H04N 21/6118* (2013.01); *G10L 2015/223* (2013.01)

(58) Field of Classification Search
  CPC ....... G10L 13/043; G10L 15/22; G10L 15/30; G10L 15/265; G10L 2015/223
  See application file for complete search history.

(56) References Cited

U.S. PATENT DOCUMENTS

| | | | | |
|---|---|---|---|---|
| 2011/0282949 | A1* | 11/2011 | Rivkin | .................... G06F 15/16 |
| 2015/0143262 | A1 | 5/2015 | Norwood et al. | |
| 2016/0124564 | A1* | 5/2016 | Huang | .................. G06F 3/0416 |

FOREIGN PATENT DOCUMENTS

| | | |
|---|---|---|
| CN | 105100933 | 11/2015 |
| CN | 106878793 | 6/2017 |

OTHER PUBLICATIONS

Notice of Preliminary Rejection dated May 6, 2021 in KR Patent Application No. 10-2020-7007537 with English translation.
PCT International Search Report & Written Opinion, RE: Application No. PCT/CN2017/102097, dated Jun. 7, 2018.
Notification of First Office Action dated May 28, 2021 in Chinese Patent Application No. 201780094935.2 with English translation.
Notification of Second Office Action dated Dec. 16, 2021 in Chinese Patent Application No. 201780094935.2.
Notice of Preliminary Rejection dated Dec. 2, 2021 in Korean Patent Application No. 10-2021-7034235 with English translation.

\* cited by examiner

MULTIMEDIA BULLET SCREEN ON TV VIA REMOTE CONTROL INPUT DEVICE AND SET TOP BOX

TECHNICAL FIELD

The present subject matter relates to techniques and equipment to provide a multimedia comment screen (i.e., "bullet screen") that allows voice or text inputs from a remote control (RC) input device coupled to a user's set top box (STB) to be input to an on-going video presentation.

BACKGROUND

Social media has enabled persons to post comments with regard to various video content, such as news stories, fitness, fashion, retail, technology or the like. Typically, the comments are posted below or to the side of the visible content. This ability to comment is substantially real time and allows all viewers of the content to participate (if their devices are capable of participating) with the discussion in the posted comments. However, a user's ability to stay focused on the content and read the comments is difficult due to the presentation of the comments in areas different from the presentation of the content.

The content, such as video, such as movies, or serial programs, streaming graphical content, such as games, animations or the like, is presented on a display device for viewing by users. The content changes in real time so it is difficult for users to input comments that other users/viewers may read and respond to with a follow-up comment. To address such a problem it has been suggested that comments be posted "over" or "on top of" of the content in small areas to enable viewers/users to simultaneously view the content and a number of comments. These types of presentations are referred to as "bullet screens."

A "bullet screen" is a presentation of content on a display device that also presents a user/viewer's comments and other viewer's comments in the form of text "bullets" on the display device. The user is able to see the content with the "bullets" or comments contemporaneously with viewing of the content to which the comments relate. Such "bullet" screens may be provided in various forms. For example, a form of bullet screen is provided by using two distinct Internet Protocol (IP) browsers, one that provides the content and the other browser providing the "bullet" screen. The outputs of each of the distinct browsers is combined at the display device. The text inputs to the "bullet" screen browser are provided via a smartphone.

However, the present systems are limited to using only a smartphone and receiving text inputs via respective IP browsers. It would be advantageous if a system and method were provided that improved the ease of input of the user comments, and was more accessible in a typical viewing area of a premises, such as a user's home.

SUMMARY

The concepts disclosed herein provide examples of a system including a set top box coupled to a remote control input device that facilitate the input of user comments for inclusion as streaming content, e.g. for presentation with displayed video content.

An example of a system includes a set top box, a display device, a remote control input unit, and a media server coupled to a cable television network. The set top box is coupled to a cable television network, and the set top box includes a radio frequency transceiver, a processor, and a memory. The memory stores computer programming executable by the processor. A display device is coupled to the set top box, for presenting the content delivered from a media server via the cable television network to the set top box. The system also includes a wireless remote control input device with an audio input device, a tactile input device and a wireless transceiver. The media server, coupled to the cable television network, is configured to deliver content via the cable television network to the set top box in the cable television network. The set top box is coupled to the display device, the wireless remote control input device and, via the cable television network, to the media server. The set top box is configured to perform functions upon execution by the set top box processor of the computer programming stored in the set top box memory. The functions include receiving a stream of graphical content from the media server. The streaming graphical content a are provided to the display device for presentation of the streaming graphical content. A comment-related input is received from the remote control input device. The comment-related input being related to the streaming graphical content presented on the display device. In response to receiving the comment-related input, a comment based on the received comment-related input is generated. The generated comment is sent to the media server. Based on the generated comment with the streaming graphical content from the media server, textual content is received. The streaming graphical content and the textual content is presented on the display device. The presented textual content is shown as text by the display device contemporaneously with the streaming graphical content.

An example of a method is also provided in which a set top box receives streaming graphical content from a media server at a set top box. The streaming graphical content is presented on a display device coupled to the set top box. The set top box receives a comment-related input received from a remote control input device coupled to the set top box. In response to receiving the comment-related input, the set top box generates a comment based on the received input. The set top box sends the generated comment to the media server. The set top box receives textual content with the streaming graphical content, the textual content based on the generated comment sent by the set top box to the media server. The streaming graphical content with the textual content is presented on the display device. The textual content representing the generated comment being presented as text on the display device.

An example of a non-transitory tangible computer readable medium embodying instructions to cause a processor to perform functions is also provided. The functions provided by the non-transitory tangible computer readable medium include receiving a stream of graphical content from the media server. The streaming graphical content is provided to the display device for presentation of the streaming graphical content. A comment-related input is received from the remote control input device. The comment-related input being related to the presented streaming graphical content. In response to receiving the comment-related input, a comment is generated based on the received comment-related input. The generated comment is sent to the media server. Textual content is received, based on the generated comment, with the streaming graphical content from the media server. The streaming graphical content and the textual content is provided to the display device for presentation.

The presented textual content is shown as text on the display device contemporaneously with the streaming graphical content.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

It would be beneficial if a user would be able to input a comment from their own home utilizing a cable network provided set top box and a remote control input device in wireless communication with the set top box.

An alternative or additional benefit would be that the remote control input device enables a voice input so that the user may quickly input their comment. The ability to provide a voice input is advantageous as many cable network-provided remote control input devices do not have a typical QWERTY keyboard or easily manipulated keypads that enable rapid input of comments that can be provided in near real time with the presented graphical content. As such there may be a need for system that permits voice input of comments and the supply of the additional textual comments to the cable network system for inclusion of the comments with the streaming graphical content, such as movies, videos, games and the like.

Figure 1:
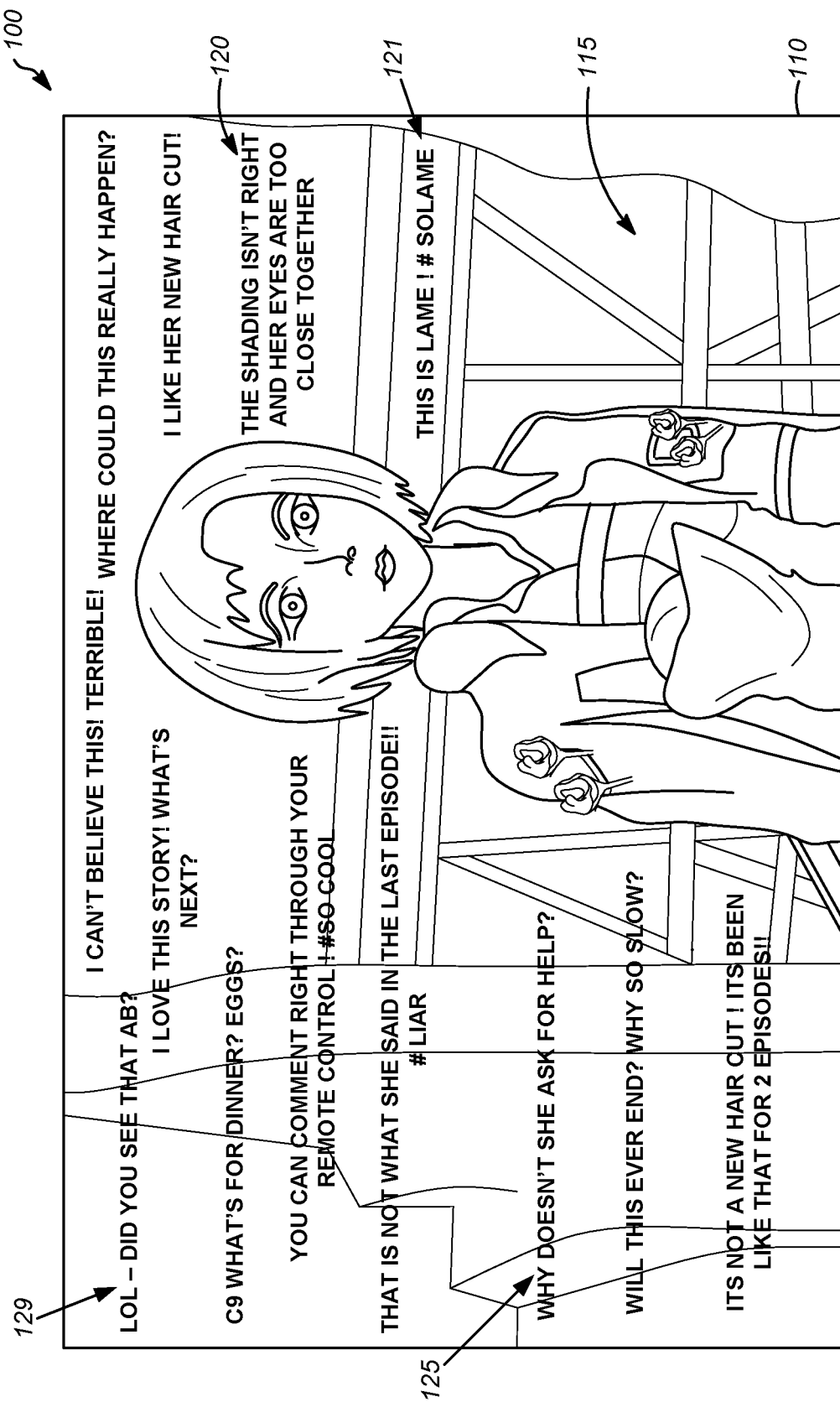
FIG. 1 illustrates a graphical representation of an example of a presentation of content in the form of a bullet screen containing user comments as textual content and graphical content that are presented contemporaneously as provided by the examples described herein.

FIG. 1 illustrates a graphical representation of an example of a bullet screen containing user comments and graphical content as provided by the examples described herein.

The term "bullet screen" is jargon for a displayed presentation of streaming graphical content, such as video or animation, contemporaneously with textual content (also referred to as "comments" herein) on a display device, such as a television, computer monitor, or the like. The bullet screen 100 in FIG. 1 is an example of graphical content 115 that may be presented on a user's display device 110. The graphical content 115 may be any form of graphics, video, still imagery, animations, or the like that is provided by a cable television system provider and/or content provider. In an example, the streaming graphical content is continuously updated. In other examples, the streaming content may be periodically or intermittently updated. In addition to presenting the graphical content 115, the bullet screen 100 also presents textual comments 120 that are overlaid on the content 115 so that viewer's may view the textual comments 120. For example, the comments 121 and 129 may scroll across the bullet screen 100 as new comments are presented on the bullet screen 100. Comments 120 may not be posted as soon as the comments are received by the respective STB or the media server (both explained in more detail with reference to FIGS. 2A and 2B). The comments 120 are presented for a predetermined amount of time before being replaced by other viewer's comments, including the user's comments. Comment 121 when first presented on the bullet screen 100 may have appeared at the location on the bullet screen 100 now occupied by comment 129. As the additional comments are presented on the bullet screen 100, previously presented comments may eventually "drop off" and no longer be presented on any of display devices, such as DD1-$n$ of FIG. 2A.

A "user" is a person that is inputting comments using the system(s) described with reference to the examples of FIGS. 2A-4B. The user is also a viewer, who may view their own comments or as well as other viewer's comments 120 together with the graphical content. The other viewers may or may not use the same system as described herein to input their comments 120. For example, some other viewers may use their set to boxes and remote controls to input comments while other viewers user their mobile devices to provide comments.

Figure 2A:
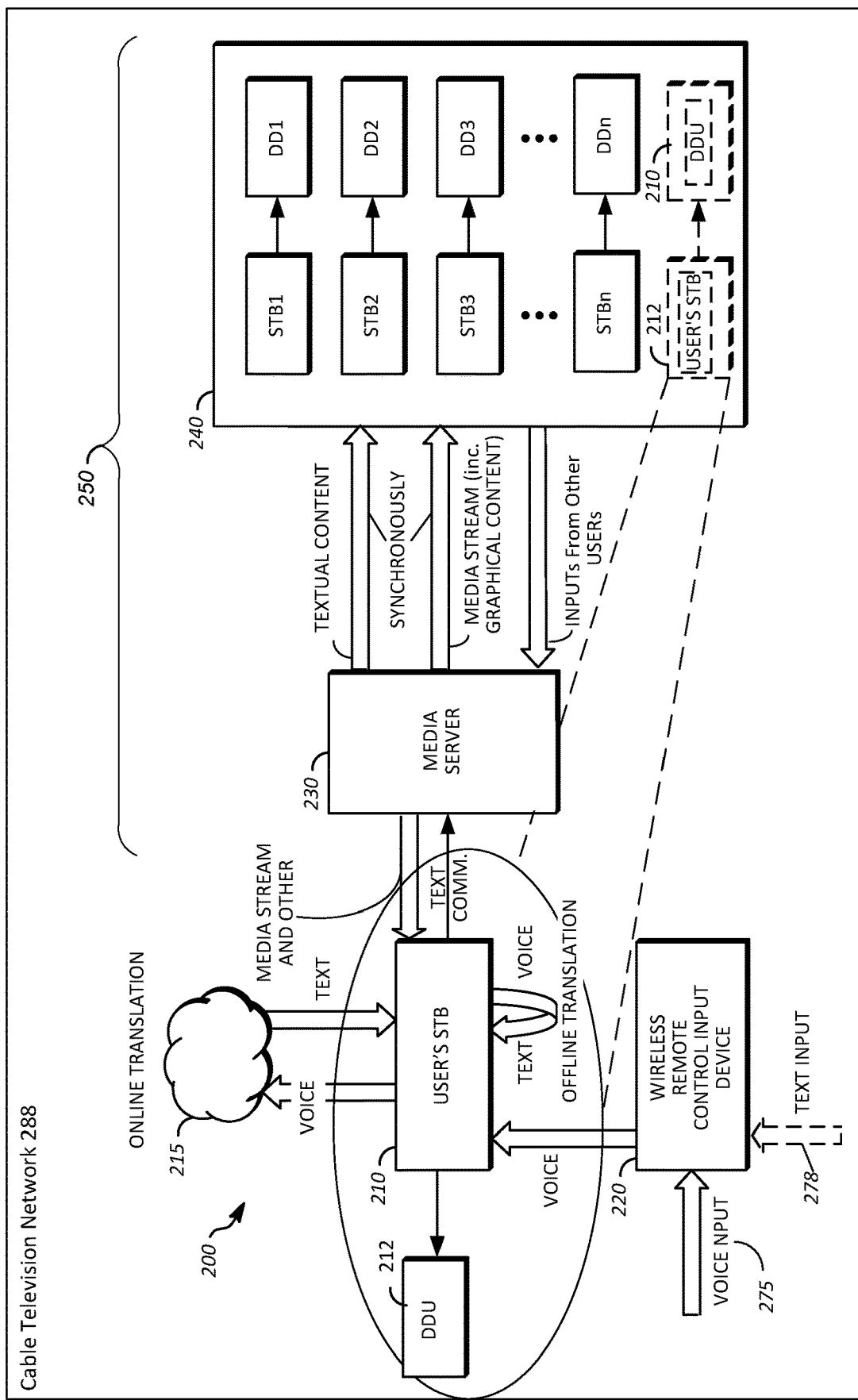
FIG. 2A shows a high-level block diagram example of a cable television system that implements an example process for providing bullet screen functionality to customer premises.

The bullet screen 100, the graphical content 115 and comments 120 are provided by a system, such as the system shown in the example of FIG. 2A. FIG. 2A shows a high-level block diagram example of a cable television system for implementing an example process that provides bullet screen functionality to a customer premises.

The system 200 is part of a cable television network 250. The system 200 includes a user's set top box (STB) 210, a radio frequency remote control input device 220, a user display device (DDU) 212, a media server 230, and a head end 240. The head end 240 supplies content and services to customer premises equipment (CPE), such as set top boxes 1-$n$ (STB1-$n$). The STB1-$n$ are coupled to a respective display device (DD) 1-$n$ at respective customer premises. The DD1-$n$ are configured to present the video and text that forms the bullet screen as well as any audio output associated with the content of the bullet screen and/or the comments presented in the bullet screen.

In an example, the STB 210 as well as STBs 1-$n$ in system 200 are configured to receive television signals and sending and receiving audio information to and from the network 100. The user's STB 210 is similar to the STBs 1-$n$ shown in the head end 240; therefore, a detailed discussion of the STBs 1-n will not be made. The STB 210 is configured to receive and display standard analog or digital television signals or high-definition television (HDTV) signals. The STB 210 is also configured to receive wireless (e.g., Bluetooth and/or infrared) control signals from a wireless remote control input device 220. The details of the STB 210 will be described in more detail with reference to the example of FIG. 3.

The wireless remote control input device 220 may be a Bluetooth remote control input device configured to accept voice inputs, such as 275, and/or text inputs, such as 278, as well as dedicated function inputs (not shown in this example) that are provided to the STB 210 for processing and/or for control purposes. For example, and not shown in this example, the wireless remote control input device 220 may include an audio input device, a tactile or haptic input device (such as a keyboard, pushbuttons, touchscreen or the like) and one or more wireless transceivers, such as a Bluetooth transceiver, an infrared transceiver, a Wi-Fi transceiver, a Zigbee transceiver and/or the like. The wireless remote control input device 220 (also referred to as "remote control") is described in more detail with reference to the examples of FIGS. 4A and 4B.

The display device 212 may be a television, computer monitor or the like. In an example, a remote control input device 220 is provided for convenient remote operation of the STB 210 and the display device 212. As described below, the remote control 220 may communicate with the STB 210 and display device 212 using conventional techniques to adjust, for example, the volume of the display device 212, the displayed channel, and the like.

In the example of FIG. 2A, the user STB 210 is coupled to a cable television network, such as 250 and to a display device DDU 212.

The media server 230 may be an internet protocol television (IPTV) server, and may be configured to provide content, such as graphical content and/or textual content, from content providers, such as Amazon®, Disney®, Netflix®, Comcast®, and the like, to the system 200. The media server 230 is also coupled to the cable television network 250. The media server 250, in some examples, is configured to deliver content via the cable television network to the set top box in the cable television network 250. As mentioned above, the graphical content, such as 115 of FIG. 1, may be any form of graphics, video, still imagery, animations, or the like. In particular, the delivered content, such as 115 and 120, may be streaming graphical content, which is video content, a series of graphical images, such as animations, series of still images, or the like, and/or textual content, such as text presented by itself on a display device, or text that is presented with the streaming graphical content.

In the example of FIG. 2A, the DDU 212 is coupled to the user STB 210, and presents the content delivered from the media server 230 via the cable television network 250 to the STB 212. It may be appropriate at this time to discuss an operational example of the general system 200 with reference to the example process illustrated in FIG. 2B.

Figure 2B:
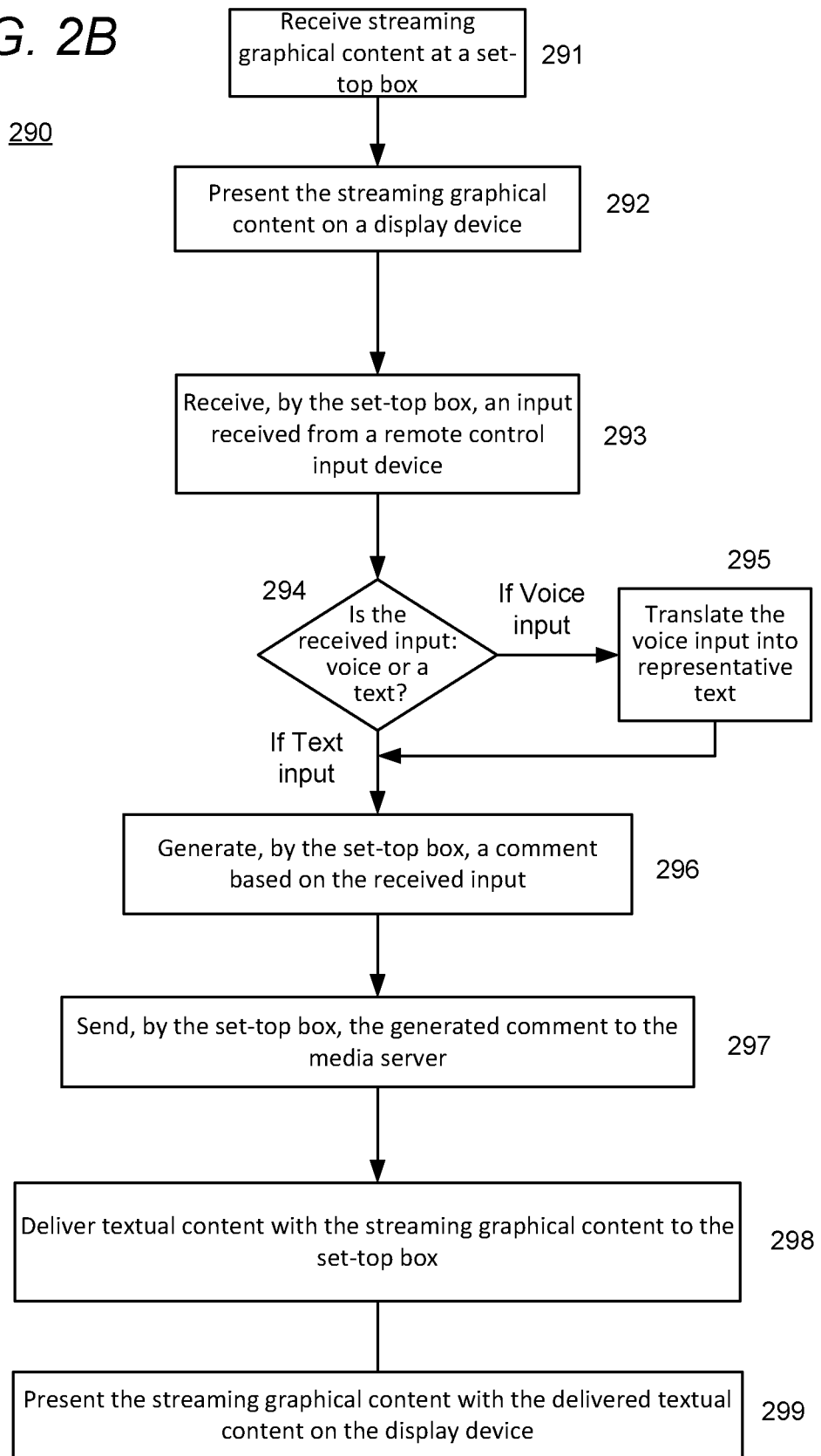
FIG. 2B is a flowchart of an example process executed by a system such as that shown in the examples described with reference to FIGS. 1, 2A and 3-5.

FIG. 2B is a flowchart of an example process executed by a system such as that shown in the examples described with reference to FIG. 2A as well as those examples shown in FIGS. 1 and 3-5.

As discussed above, a bullet screen, such as 100, may be enabled via the media server 230. As the comments are received by the media server 230, the message containing the comment may have an identifier as to what program that the comment is related to, and the media server 230 may use the identifier to deliver the comment with streaming graphical content to all STBs, such as STBs 1-n and 210 of FIG. 2A that are tuned to receive the streaming graphical content. A wireless remote control input device is coupled to the respective set top box.

In the flowchart of FIG. 2B, the process 290 from the perspective of a set top box, such as 210 of a number of set top boxes (e.g., 210 and STBs 1-n of FIG. 2A) begins at step 291, with the respective set top box receiving streaming graphical content, such as 115. Each of the number of set top boxes is configured to receive the same streaming graphical content. The streaming graphical content may be received, for example, from a media server. At step 292, the streaming graphical content is presented on a respective display device, such as DD 1-n and/or DDU 212. The respective display device (e.g., DDU 212) is coupled to the respective set top box 210 of the number of set top boxes (STBs 1-n and 210). The respective set top box receives via a wireless remote control input device, such as 220, a comment-related input (step 293). The received comment-related input may be a voice input or a text input.

For example, the wireless remote control input device, such as 220, may be configured to receive the comment-related input as a voice input or a text input. As will be described in more detail with reference to the examples of FIGS. 4A and 4B, the wireless remote control input device may be configured to indicate to the respective set top box when a user is inputting a comment for inclusion in the streaming graphical content. For example, the wireless remote control input device may have a dedicated user interface device (e.g., button, switch, area of a touchscreen, or the like) or a combination of user interface device (e.g., buttons, switches, areas of a touchscreen, or the like) on the remote control input device. The wireless remote control input device may be configured to, in response to receiving the user input indicating the user's intention to enter a comment, enable an audio input device, such as a microphone and related circuitry, or a tactile/haptic user interface, such as the keyboard, alphanumeric key pad or touchscreen, that receives text inputs. If the user indicates the intention to enter a comment-related input via a voice input, the wireless remote control input device may be configured with an audio input device that detects a user's speech, and converts the detected speech into audio information for processing by the processor of the respective set top box. In the case of a text input, the wireless remote control input device may accept text inputs from a keyboard, alphanumeric key pad or touchscreen. Note the text inputs may include emojis, icons, symbols (e.g., hashtags, punctuation, characters of different languages, such as Chinese, Japanese, Arabic, English, Cyrillic or the like), uniform resource locators (URLs), hyperlinks or the like.

Returning to the process 290 at step 294, the respective set top box processor may determine whether the comment-related input from the remote control input device is a voice input or a text input.

In response to the determination at step 294 that the comment-related input is a voice input, the process 290 proceeds to step 295, the respective set top box processor may translate voice information from the voice input into a translated-voice text file corresponding to the voice information. The processor is further configured to use the translated voice text file to generate a comment. Translation of the voice information to text may be performed in various manners. For example, the set top box processor may be configured to execute a voice-to-text program stored in the memory of the set top box. As a result of the executed voice-to-text program, text may be output by the processor as representative text. The representative text represents the voice input.

Alternatively, the set top box processor may be configured to transmit the voice information to a network-based text-to-voice service. In response to transmitting the voice information, the processor may receive text, e.g., translated text, representative of the voice information from the network-based voice-to-text service. The processor, based on the text received from the network-based text-to-voice service, outputs the received text as representative text.

Whether the voice information from the voice input is translated by the set top box processor or by the network-based text-to-voice service at step 295, the process 290 proceeds to step 296.

Alternatively, in response to the determination at step 294 that the received comment-related input is a text input containing text input information represented by text, the process 290 proceeds to step 296 in which the respective set top box processor uses the text input information to generate a comment.

At step 296, the set top box processor in response to receiving the comment-related input, may generate a comment using the representative text of the voice-to-text translation based on the received input or the text provided via the comment-related input. For example, the representative text may either be the text input as the comment-related input from the wireless remote control input device or from the translation of the voice input as the comment-related input.

After generation of the comment based on the received input at 296, the process 290 proceeds to step 297. At step 297, the respective set top box sends the generated comment to the media server. The generated comment may be formatted by the respective set top box prior to sending the generated comment to the media server. The respective set top box may format the generated comment according to extensible markup language (XML), JavaScript object notation (JSON), or other format compatible with the hypertext transfer protocol (HTTP).

The media server may be configured to process the generated comment to produce textual content suitable for presentation on a display device. The media server at 298 delivers textual content based on the generated comment sent by the respective set top box with the streaming graphical content to the respective set top box as well as a number of other set top boxes that are receiving the streaming graphic content.

Note that users may opt into or out of receiving the added textual content based on the generated comment with the streaming graphical content. For example, some users may not wish to view the bullet screen presentation of streaming graphical content and textual content, so these users may opt out of receiving the textual content. When opted out, only the streaming graphical content is presented on the user's display device. For example, these users may make a selection in a settings menu of their set top box settings to opt into or out of the bullet screen presentation.

Returning to the example of FIG. 2B, the respective set top box, upon receipt of the textual content with the streaming content from the media server, presents at step 299 the streaming graphical content with textual content on a display device coupled to the respective set top box. The presented textual content representing the generated comment as text on the display device.

While the above description referenced a respective set top box that both received the comment-related input and also received the textual content for presentation with the streaming graphical content, the media server may also transmit the streaming graphical content and the textual content to a number of other set top boxes, such as STB1-*n* of FIG. 2A, coupled to the media server, such as 230 of FIG. 2A, in the cable television network, such as 250 of FIG. 2A.

For example, the process 290 may also include a step, when the media server is delivering the generated comment with the graphical content to the set top box, of delivering the textual content with the graphical content to other set top boxes of the plurality of set top boxes at substantially the same time that the text communication with the graphical content is delivered to the set top box.

In another alternative at steps 294 and 295, upon the received input being determined to be a voice input, the voice information may be maintained as voice information that corresponds to the user's original voice input, such as 275, to the wireless remote control input device, such as 220. The original voice input may be transmitted as the generated comment to the media server, such as 230. The media server 230 may forward the original voice input as audio in the media stream that is delivered to the head end 240 and distributed to the STBs 1-*n*.

Figure 3:
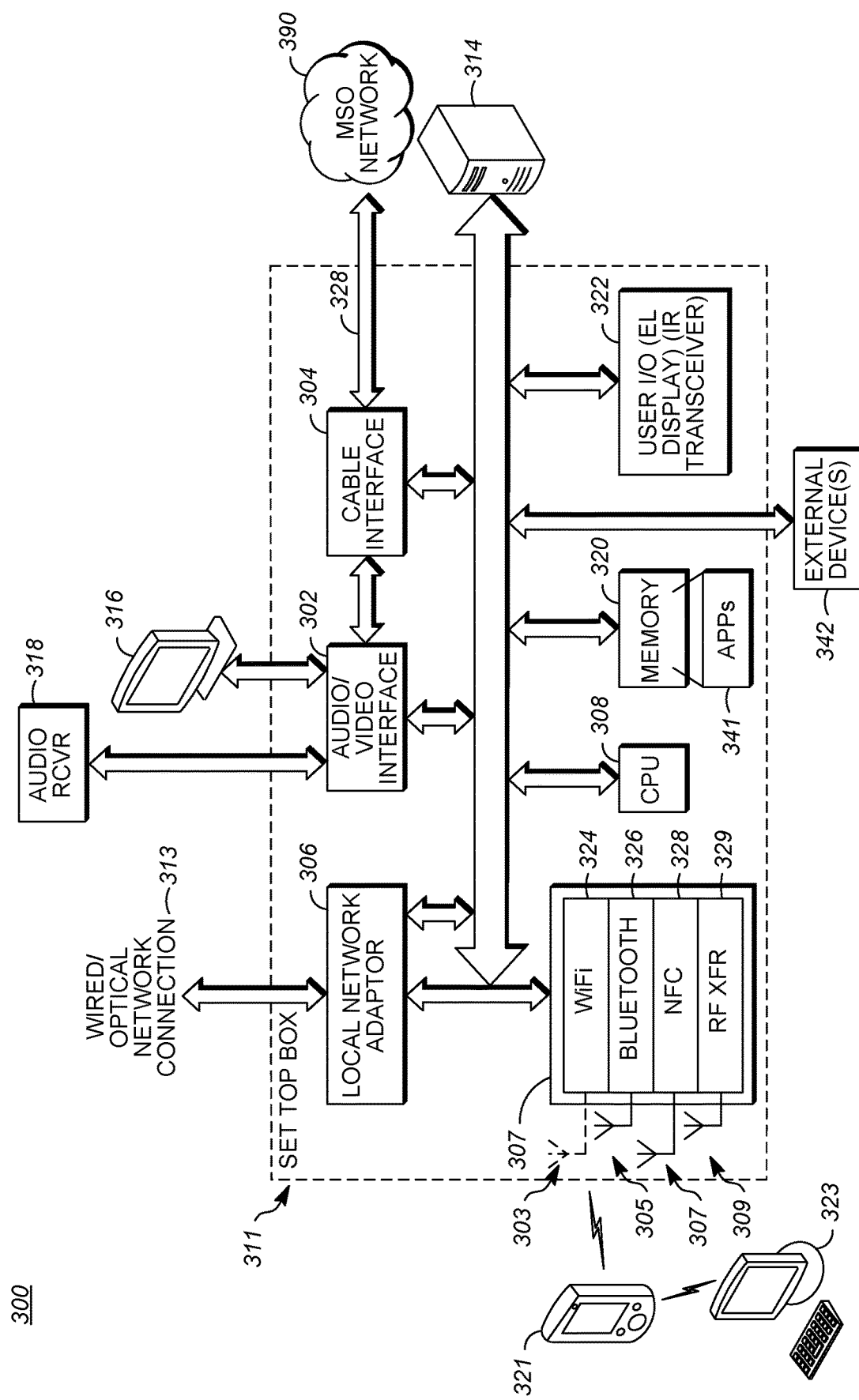
FIG. 3 shows a block diagram of an example of a set top box (STB), such as STB 210 of FIG. 2A, in more detail.

FIG. 3 shows a high-level block diagram of an example set top box (STB) suitable for use in the examples of FIGS. 2A and 2B. The STB 311 includes one or more wireless transceivers, a processor, input/output terminals, and a memory.

The example STB 311 includes an audio video interface 302 for processing data, e.g. decoding an MPEG or HEVC video stream to output visual content for display on display device 316 and to stream audio content to display device 316 and/or audio receiver 318. The STB 311 also includes an interface for local communication with consumer premises equipment (CPE) devices, and in this example, that interface takes the form of a local network adapter 306 which includes a wired/optical communication port as well as wireless ports to WiFi transceiver 324, Bluetooth® transceiver 326, NFC transceiver 328 and an RF transceiver (labeled "RF XFR), such as a ZigBee RF4CE transceiver. In this example, WiFi transceiver 324 may be a WiFi access point. The wired/optical network connection 313 may be coupled to the local network adaptor 306.

The STB 311 also includes cable interface 304 for receiving programming and Internet protocol (IP) packets from an edge serving office (ESO) (not shown). An ESO may be a headend or central office of a multiple service provider (MSO) 390, such as a cable, satellite, or telephone company. The IP packets may, for example, include HEVC streams, encapsulated MPEG transport streams, Windows Media streams or other audio/video streaming data. The video data received and processed by the STB 311 is collectively referred to herein as video streams. These streams may include MPEG transport streams from the cable interface 304, IP encapsulated MPEG or HEVC transport streams from the MSO 390 ESO, HEVC video streams, Windows Media video streams or other streaming video data. The circuitry of the audio video interface 302 may include circuitry that decodes selected video streams to send decoded video data to the display device 316.

The MSO network 390 may be coupled to a cable input line 328 of the STB 311. In instances where the MSO 390 delivers a number of channels of content, such as sports channels, cooking show channels, history-related channels, premium movie channels, public service channels, traditional television network channels and the like, a viewer/user may select to view the different channels via the first source I/O terminal 322 of the STB 311. The cable interface 304 may also send and receive data over the MSO network 390 to/from an ESO-associated server (not shown) and/or a content server (not shown) to obtain media content, such as the streaming graphical content, and possibly meta-data files or meta-data related instructions from the ESO server. In addition to the MSO network 390 sources of content, other sources of content include external devices 342, sources connected via a wired/optical connection 213, computer 325 or the like of as other sources of content available through the cable input line 328. For example, the audio/video content may be provided to the STB 311 by audio and video content providers such as cable television companies, internet video and audio services, such as Netflix®, Roku®, Hulu®, CBS All Access®, Amazon® and the like, streaming audio services, such as Pandora®, iHeart® radio and the like, gaming sources, such a Xbox®, PlayStation®, Wii®, internet sources, as well as DVD players, CD players, cameras, computers, audio/video portable devices (e.g., iPods® and smartphones), and similar devices and services.

The STB 311 also includes circuits forming one or more processors to implement a CPU 308 and memory 310 for controlling operations of the STB 311, including executing programming instructions for performing the processing for the volume setting application as well as programming related to user input and control functions, such as those described with reference to FIG. 2A. The example STB 311 is connected to the network attached storage (NAS) device 314 for storing data, such as, for example, volume setting application user preference information, information related to volume setting, such as a set of volume settings, media content and meta-data files downloaded via the MSO network 390, and the like. The memory 310 may include one or more memories and/or other program and data storage devices, for example, for storing instructions executable by the CPU 308. The memory 320 storing computer programming executable by the processor CPU 308. The memory 310 may also include program instructions, such as computer applications (Apps) 341, user preference information, associated mobile device information, and the like related to the comment-related inputs, voice-to-text translations and/or other functions described above with reference to FIGS. 2A and 2B. For example, the functions related to the comment-related inputs and/or voice-to-text translations may be stored in the memory 320 as one of the Apps 341.

The example STB 311 also includes a user I/O interface 322. The user I/O interface 322 may include an electroluminescent (EL), liquid crystal device (LCD), or light emitting diode (LED) display for displaying information to the user watching the display device 316. The user I/O interface 322 may also include an infrared (IR) receiver for receiving instructions from a user's remote control (not shown). Although not shown in detail, this IR receiver may be implemented as an IR transceiver and provide a communication channel for sending and receiving short-range optical communications between the STB 311 and one or more of the CPE devices, such as display device 212, devices 321 or 323, external devices 342, or the like.

Figure 4A:
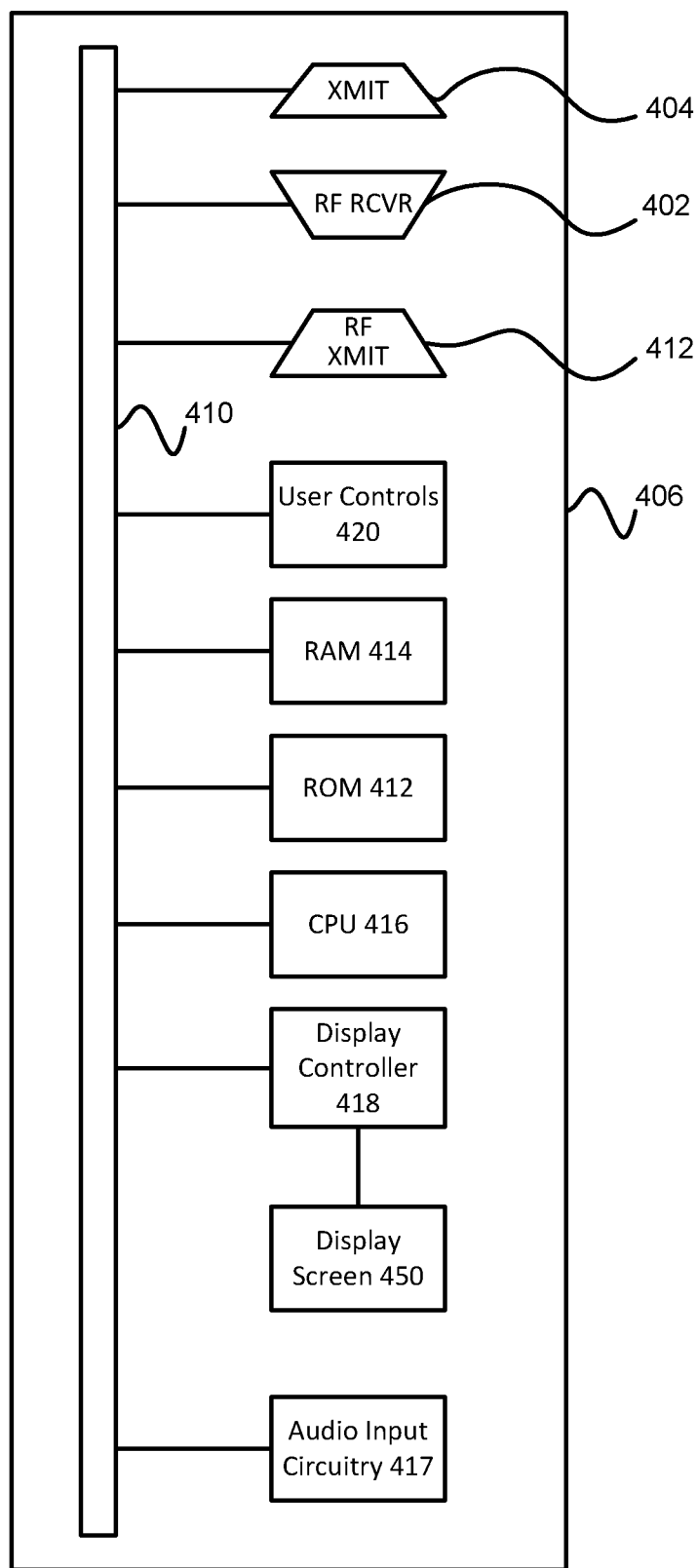
FIGS. 4A and 4B illustrate high level block diagrams of an example of remote control usable in the examples of FIGS. 1-3 and 5.

FIG. 4A illustrates a high level diagram of an example of remote control usable in the examples of FIGS. 1-3 and 5. Referring to FIG. 4A, a schematic block diagram illustrates physical components of a remote control 406 according to one example of the invention. The remote control 406 may include a bus 410 configured to transfer digital signals between the various components of the remote control 406.

Additionally, a CPU 416 may be coupled to the bus 410 and be provided to execute software instructions within the RAM 414 and/or the ROM 412. The CPU 416 may be of any known type, such as a standard microprocessor, microcontroller, digital signal processor (DSP), reduced instruction set computing (RISC) processor, field programmable gate array (FPGA), or application-specific integrated circuit (ASIC).

The remote control 406 may also include a read-only memory (ROM) 412 that contains data to be permanently stored within the remote control 406. For example, the ROM 412 may contain an operating system (OS) to control the operation of the remote control 406. The OS may be of a commonly available type, such as Windows CE®, Linux® or the like. The ROM 412 may take the form of one or more programmable read-only memory (PROM) modules, electrically-erasable PROM (EEPROM) modules, or the like.

Additionally, the remote control 406 preferably includes a random access memory (RAM) 414 for storing temporary data. The RAM 414 may store data, for example, for an electronic program guide, default settings, parental settings, user preferences, and/or other information relevant to the operation of the remote control 406.

Figure 4B:
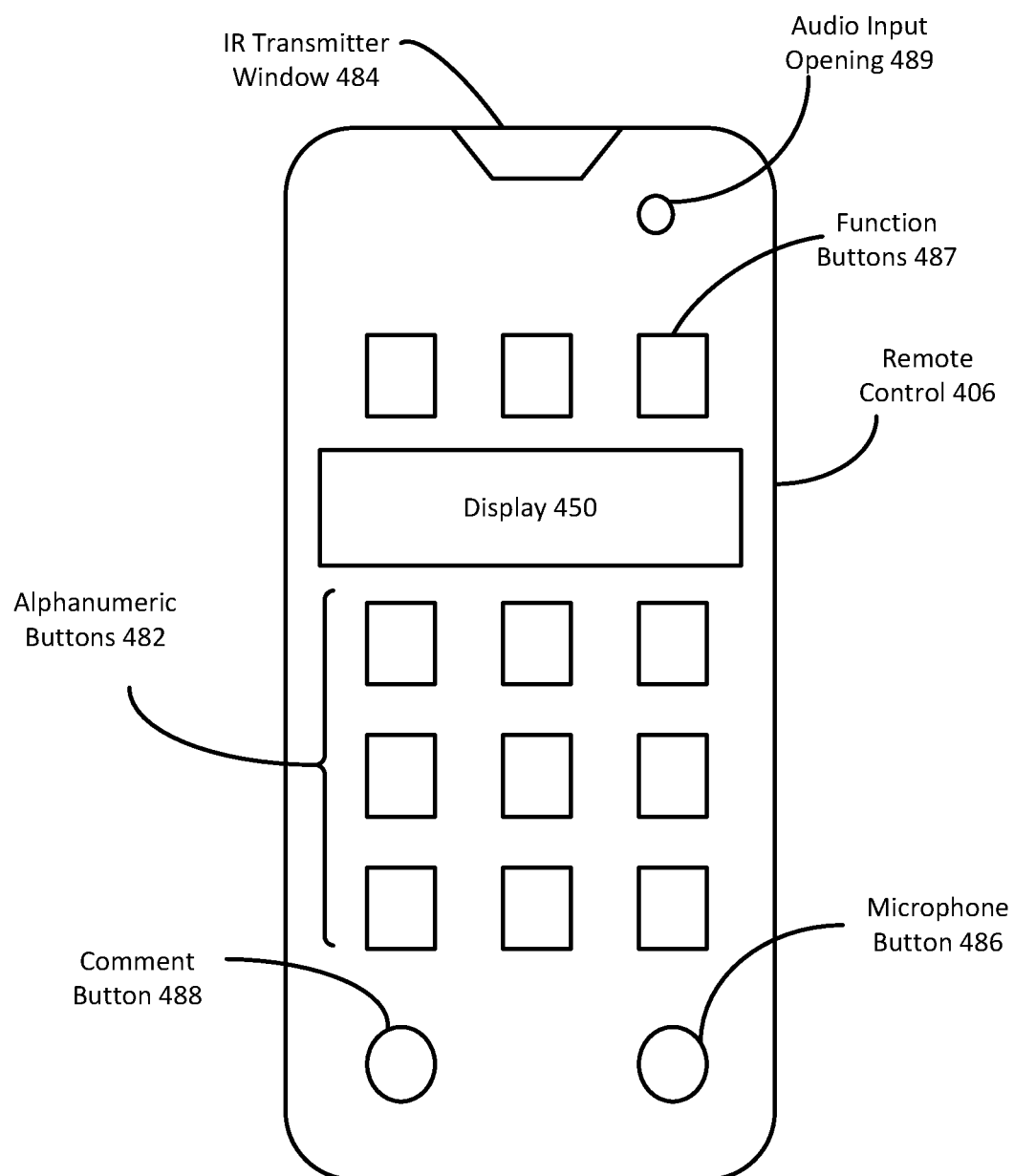

The audio input circuitry 417 may be in electrical communication with a microphone button 486 of FIG. 4B, which toggles operation of the audio input circuitry 417 in one implementation. The remote control 406 may further include additional buttons to control various features of, for example, the STB 210 and the display device 212 of FIG. 2A. As used herein, the term "button" contemplates other types of controls, such as switches and the like. In addition, multiple buttons or controls may be provided for activating and deactivating the audio input circuitry 417.

In the illustrated embodiment, the remote control 406 further includes a radio frequency (RF) transmitter 412 and receiver 402. In addition embodiments, another transmitter 404 may be configured to use infrared (IR), microwave, VHF, UHF, or other frequencies along the electromagnetic spectrum different the RF frequency of the RF transmitter 412.

In accordance with an example, the RF transmitter 412 may comprises an integrated RF antenna (linear or otherwise configured) etched onto the main printed circuit board of the remote 204. Integration of the antenna with the remote control's circuit board provides for compactness and efficiency in manufacture.

In an example, the RF transmitter 412 is in electrical communication with the audio input circuitry 417 to receive captured audio information. The audio input circuitry 417, for example, may include a microphone with an audio coder (not shown) that detects speech-related audio inputs from a person speaking or for another audio source, such as a speaker. The audio input circuitry 417 may provide voice information generated from the speech-related audio inputs to the processor 416 and/or the RF transmitter 412.

The RF transmitter 412 preferably modulates the voice information with a carrier frequency to enable transmission thereof to the STB 210 using techniques well known in the art. For example, the RF transmitter 412 may operate according to the IEEE 802.11a or 802.11b Wireless Networking standards, the "Bluetooth" standard, or according to other standard or proprietary wireless techniques. Modulation techniques may include spread spectrum, frequency shift keying, multiple carrier, or other techniques known in the art.

In the example of FIG. 2A, the STB 210 and the remote control input device 220 may be paired together according to the Bluetooth specification. As such, when the remote control input device 220 is configured in the manner of remote control input device 406, the remote control 406 may similarly be configured to pair with a STB 210.

To achieve modulation and transmission, the RF transmitter 412 may include various additional components not specifically illustrated but well known in the art. For example, the RF transmitter 412 may include a source encoder to reduce the amount of bandwidth required, a channel encoder to modulate the audio information with a carrier wave, and a directional or non-directional transmission antenna. The RF transmitter 412 may further include an amplifier to increase the transmission signal strength to an appropriate power level. Preferably, the RF transmitter 412 is a high-bandwidth transmitter capable of sending the audio information to the STB 210 in real time. In an example, the RF transmitter 412 may use wideband frequency modulation over a frequency band to provide a one-way audio link from the remote control 406 to, for example, the STB 210. For example, frequency band may be within the 890-960 MHz range (GSM), 1990-2110 MHz range or 2400-2500 MHz range or other frequency ranges as approved by FCC regulations. The one-way audio link between remote control input device 406 and STB 102 also provides for efficiency in manufacture, as a two-way audio link is not required in accordance with this embodiment. In another embodiment, the RF transmitter 412 utilizes a frequency division multiplexing (FDM) technique in order to transmit several streams of data simultaneously. These streams may be reassembled at the STB 210 to derive the encoded audio information. Various other techniques for providing a high bandwidth in multimedia transmissions may also be used as are known in the relevant STB technology.

In an example, the RF transmitter 412 is configured to broadcast digital signals. As such, the RF transmitter 412 may include an analog-to-digital converter (ADC) to convert analog audio signals comprising voice information from the audio input circuitry 417 into digital information. The examples may use both the use of analog and digital transmissions from the remote control 406.

The processor 416 upon executing the programming instructions stored in the memory configures the remote control input device 406 to perform functions. The functions include enabling the audio input circuitry 417 to generate, by an audio coder (not shown), voice information in response to received audio inputs. The voice information may be coded data that is forwarded, via the RF transmitter to a STB, such as 210, for input to a voice-to-text translation program or service for recognition of the coded data, and output as representative text corresponding to the voice information.

The audio input circuitry 417 as described herein may include one or more audio/electrical transducers of a type to enable audible speech input. Such audio input circuitry 417 enables a user to make spoken inputs to the remote control 406 that executes machine readable code to process the inputs and enables the machine to output a result of the processing for transmission to the STB. The inputs, in the particular examples, may typically be speech-based inputs. Examples of microphones that may be used as part of the audio input circuitry 417 include digital/analog-type, micro-electro-mechanical system (MEMS), condenser, optical microphones or the like. The example audio input circuitry 417 may, as mentioned, include an audio coder or processor (not shown). For example, the audio input circuitry 417 may convert an audio responsive analog signal from a microphone to a digital format and supplies the digital audio to the CPU 416 for processing and/or to a memory 414 for temporary storage. The audio input circuitry 417 may be configured to perform tasks such as audio conditioning and noise cancellation. "Speech" is an analog audio sound that includes spoken/verbal information for human communication.

The remote control input device 406 may include an optional display controller 418 that may be provided to control the operation of an optional display screen 450. As such, the display controller 418 may include graphics hardware capable of transforming a display signal into a signal usable by the display screen 450 to produce a visual output. The display controller 418 may be adapted to provide a monochromatic or color display, as desired.

The remote control 406 may also have user controls 420, which include the alphanumeric buttons 482, microphone button 486, comment button 488, function buttons 487, such as search, record, favorite channel, channel up/down, or the like. The user controls 420 of the remote control 406 may also include additional buttons, sliders, switches, touch pads, shuttles, or other devices that may facilitate user operation of the remote control 406. Other components such as a power supply, backlight for the user controls 420, or the like may also be included, as known in the art.

FIG. 4B provides an exterior view of a block diagram of the remote control input device of FIG. 4A. The remote control input device 406 includes an IR transmitter window 484, a microphone button 486, a display 450, an audio input opening 489, a comment button 488 and function buttons 487. Those skilled in the art will recognize that the various components of the remote control 406 may be positioned in different locations for convenience and ergonomics.

In the illustrated example, the remote control 406 includes a microphone button 486, which may enable the audio input circuitry 417. An audio input opening 489 enables the audio input circuitry 417 to capture sound waves and generate an analog or digital audio signal containing voice information.

In various examples, the remote control 406 is also in electrical communication with a processor (such as 416 of FIG. 4A) that senses a user's operation of the buttons of the remote control 406 and generates appropriate command signals for transmission to the STB 210 and/or display device 212 in order to control the operation of the same. For example, if a user desires to input a comments with related to a streaming graphical input being displayed on the display device 212, the user may actuate the comment button 488. Actuation of the comment button 488 may prepare the CPU 416 to receive either in input from the microphone button, the audio input circuitry 417 or the alphanumeric buttons 482.

The alphanumeric buttons 482 may be used to insert text in response to actuation of the comment button 488, to control the channel of the STB that is providing the streaming graphical content, perform a search for content or the like. Similarly, the function buttons 487, in response to an actuation, may enable a search query menu, a digital video recorder operation, presentation of a programming guide, settings selection of the STB and/or display device, or the like.

The display 450 may be coupled to the display controller 418 and the CPU 416. The display 450 may provide status information, such as the user's inputted comment for verification and or confirmation by the user, programming guide information, or the like.

The IR transmitter window 484 enables transmission of infrared control signals to be output from the remote control 406 to control a STB or display device to which the remote control input device 406 is coupled.

The above described STB, display device and remote control input devices described in the examples of FIGS. 1-4B. An example of a cable television network, such as 250, may be described in more detail with reference to FIG. 5.

Figure 5:
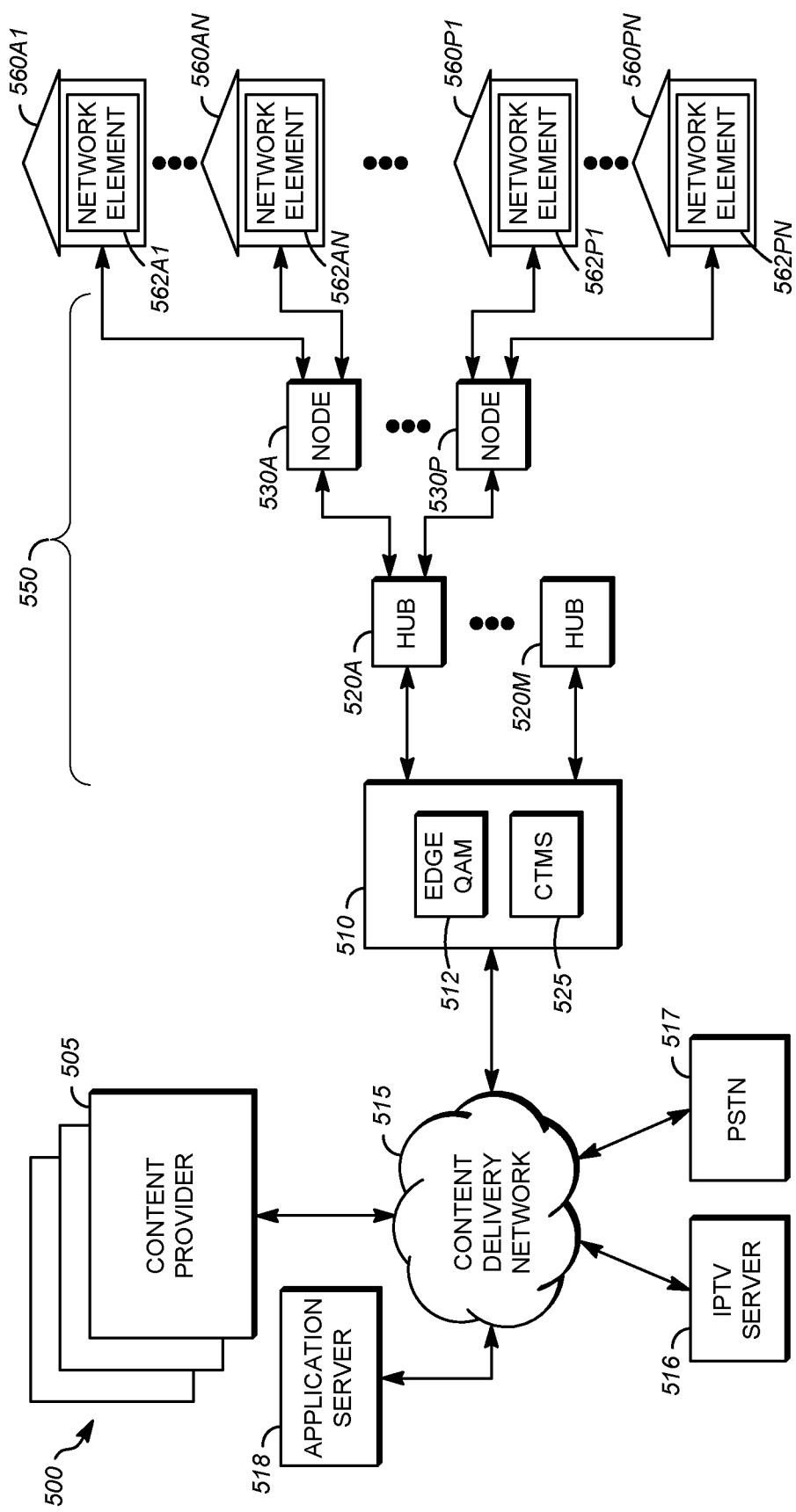
FIG. 5 illustrates a more detailed example of a cable television system such as that provided in the FIG. 2A.

FIG. 5 illustrates an example cable television network 500 including a headend facility (HEF) 510, a plurality of hubs 520A-520M, and associated with each hub, a plurality of nodes 530A-530P (collectively referred to as "530") and a plurality of customers 560A1-560AN and 560P1-560PN (collectively referred to as "560"). The HEF 510 or hubs 520A-M may have a cable modem termination system (CMTS) 525. Each of the nodes 530A-P has one or more corresponding access points, and each of the customers 560 has one or more corresponding network elements 562A1-562PN, such as a set top box. The one or more corresponding network elements 562A1-562PN may be collectively referred to as "network elements 562."

A single node of nodes 530 may be connected to hundreds of network elements such as 562A1-562PN. Examples of network elements include set top gateways (not shown), set top boxes (as shown in FIG. 2A), televisions equipped with set top boxes (not shown), data over cable service interface specification (DOCSIS) terminal devices (not shown), media terminal adapters (MTA) (not shown), and the like.

A cable television system 500 provides one or more of commercial TV services, Internet data services, and voice services, e.g., Voice-over-Internet Protocol (VoIP) to one or more customer locations 560 (i.e., end users) in a given geographic area. To provide these services, the HEF 510 in the example cable television system 500 in FIG. 5 is shown coupled via a content delivery network (CDN) 515 to a number of content providers 505, an IPTV server 516, a public switched telephone network (PSTN) 517 and one or more applications servers 518.

The content delivery network 515 may be a global broadband network (e.g. the Internet) and/or a cable data network such as an all-coaxial, a hybrid-fiber/coax (HFC) network, a passive optical network (PON) or a radio-frequency over glass (RFoG) network. Of course, other broadband access networks such as xDSL (e.g., ADSL, ADLS2, ADSL2+, VDSL, and VDSL2) and satellite systems may also be employed. In an example, the content delivery network 515 comprises, for example, a packet-switched network that is capable of delivering IP packets or data elements from an IPTV Server 516 (e.g., media server 230) to clients 560A1-560AN and 560P1-560PN, using, for example, a cable data network, HFC network, PON, RFoG network or the like. Examples of a content delivery network 515 include networks comprising, for example, managed origin and edge servers or edge cache/streaming servers.

The content delivery servers 515 deliver content via one or more wired and/or wireless telecommunication networks to users 560A1-560AN and 560P1-560PN. In an illustrative example, content delivery network 515 comprises communication links 550 connecting each distribution node and/or content delivery server to one or more client devices, e.g., for exchanging data with and delivering content downstream to the connected client devices 560A1-560AN and 560P1-560PN. The communication links may include, for example, a transmission medium such as an optical fiber, a coaxial cable, or other suitable transmission media or wireless telecommunications.

The communication links 550 of cable network system 500 may be implemented as a hybrid fiber-coaxial (HFC) network. A typical HFC network uses optical fiber for communications between the headend and the nodes and coaxial cable for communications between the nodes and the end user network elements. Downstream (also referred to as forward path) optical communications over the optical fiber are typically converted at the nodes to RF communications for transmission over the coaxial cable. Conversely, upstream (also referred to as return path) RF communications from the network elements are provided over the coaxial cables and are typically converted at the nodes to optical communications for transmission over the optical fiber. The return path optical link (the optical components in the HFC network, e.g. the transmission lasers, optical receivers, and optical fibers) contribute to the performance of the HFC network. In this HFC network 550 example, the nodes 530 communicate via optical fibers with the hubs 520 and via coaxial cable to customer premises 560. Other networks, such as PON or RFoG may employ optical connections between the nodes 530 and the customer premises 560.

The HEF 510 and/or the hubs 520 may be coupled to the IPTV server 516, PSTN 517 and/or applications server 518 via CDN 515, e.g., the internet, for providing internet and telephony services (e.g., to and from customer 560A1-560PN) via the CMTS 525. The CMTS 525, in an example, is a general-purpose computing device or application-specific integrated circuit (ASIC) that converts downstream digital data to a modulated RF signal, which is carried over the fiber and coaxial lines in the HFC network 550 to one or more customer locations 560. A communication interface may connect the CMTS 525 to the content delivery network 515 for routing traffic between the HFC network 550 and the internet network, the IP network 515, a PSTN, and/or the content providers 505. The various content providers 505, for example, may be the source of media content (e.g., movies, television channels, etc.).

It should be noted that there are multiple embodiments of a CMTS architecture, such as a CMTS with an integrated physical (PHY) layer, a CMTS with a distributed PHY, or a Converged Cable Access Platform (CCAP) architecture in which the QAM is placed in an edge QAM. In FIG. 1, the edge QAM 512 is shown in the headend 510, but the edge QAM 512 may be located downstream from the CMTS 525. The CMTS 525 may host downstream and upstream ports and may use separate F-connectors for downstream and for upstream communication for flexibility. In some examples, a communication interface utilizing, for example, downstream channels 1-4 connects the CMTS 525 to a portion of the HFC network 550 for communicating over the HFC network 550.

A customer PC or laptop as well as other associated devices such as tablets, smartphones or home routers are termed customer premises equipment (CPE). By way of example, a cable modem network element may be located at the customer's premises for receipt of the modulated signals from the HEF and/or CMTS. A cable modem is a type of network bridge and modem that provides bi-directional data communication via radio frequency channels on a cable television network, such as a hybrid fiber-coaxial plant (HFC) or RFoG infrastructure. For example, a cable modem can be added to or integrated with a set top box that provides a TV set with channels for Internet access. Cable modems may deliver broadband Internet access in the form of cable Internet, taking advantage of the high bandwidth of an HFC or RFoG network. Cable modems can also deliver video services using Internet Protocol (IP). For example, the cable modem 562 may be connected to IPTV receivers or other items of CPE.

The network elements, e.g., cable modem, 562 is connected through the network 550 to the CMTS 525. The cable modem converts signals received from the CMTS 525 carried over fiber and/or coaxial lines in the network. Cable modems 562 convert the digital data to a modulated RF signal for upstream transmission and convert downstream RF signal to digital form. Thus, the conversion is done at a subscriber's facility. The cable modem 562 demodulates the downstream RF signal and feeds the digital data to a CPE or an IPTV, for example. On the return path, digital data is fed to the cable modem (from an associated PC in the CPE, for example), which converts it to a modulated RF signal. Once the CMTS 525 receives the upstream RF signal, it demodulates it and transmits the digital data to its eventual destination. Cable modems 562 are therefore useful in transforming the cable system into a provider of video, voice and data telecommunications services to users.

The cable television network 500 may implement the disclosed OFDM techniques. In examples, the cable television network 500 complies with the Data Over Cable Service Interface Specification (DOCSIS®) protocol. DOCSIS is an international telecommunications standard that permits the addition of high speed data transfer to an existing cable television (CATV) network, such as cable television network 500. The DOCSIS protocol is the protocol used to send digital video and data between a hub 520 or headend facility 510 and cable modem 562. DOCSIS is used to convey Internet or other packet-based networking information, as well as packetized digital video between CMTSs 525 and cable modems 562. DOCSIS is employed by many cable television operators to provide Internet access over their existing network infrastructures, e.g., a hybrid fiber-coaxial (HFC) infrastructure, PON architectures, etc. While embodiments are disclosed with reference to DOCSIS, the OFDM implementations may apply to other networks or systems. For example, the disclosed techniques may apply to other systems that use OFDM-based profiles.

A typical DOCSIS architecture includes a cable modem 562 located at the customer premises 560, and CMTS 525 located at the CATV headend 510, as in the example cable television network 500 depicted in FIG. 5. In an example, a memory (not shown) in the headend 510, such as a memory of the CMTS 525 or edge QAM 512, may include a DOCSIS program that implements the DOCSIS specification.

Aspects of the methods of the exemplary system, apparatus and method outlined above may be embodied in programming, e.g. in the form of software, firmware, or microcode executable by a set top box, a remote control input device, a user computer system, a server computer, such as a media server, or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software, such as comment-related input and/or voice-to-text translation applications from one computer or processor into another, for example, from a management server or host processor into the memory 320 of the set top box 311. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a machine or computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may comprise a software or firmware implementation encoded in any desired language. Programming instructions, when embodied in machine readable medium accessible to a processor of a computer system or device, render computer system or device into a special-purpose machine that is customized to perform the operations specified in the program.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical or similar elements in the process, method, article, or apparatus that comprises the element.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals. Each of the various couplings may be considered a separate communications channel.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system configured to deliver content via a network, comprising:
   an electronic device coupled to a media server to receive content via the network, the electronic device comprising a radio frequency transceiver, a processor, and a memory, the memory storing computer programming executable by the processor and the processor being configured to process the content; and
   a wireless remote control input device including an audio input device, a tactile input device and a wireless transceiver,
   wherein electronic device is:
   coupled to a display device, the wireless remote control input device and, via the network, to the media server, and
   configured to perform functions upon execution by the processor of the computer programming stored in the memory, the functions include:
   receive streaming graphical content from the media server;
   provide the streaming graphical content to the display device for presentation;
   receive a comment-related input from the remote control input device, the comment-related input being related to the presented streaming graphical content;
   in response to receiving the comment-related input, generate a comment based on the received comment-related input, the comment being generated from a text file;
   send the generated comment to the media server;
   receive textual content based on the generated comment with the streaming graphical content from the media server; and
   provide the streaming graphical content and the textual content to the display device for presentation,
   wherein the presented textual content is shown as text on the display device contemporaneously with the streaming graphical content.

2. The system of claim 1, wherein the processor is further configured to:
   determine whether the received comment-related input from the remote control input device is a text input containing information represented by text; and
   in response to the determination indicating the received comment-related input is a text input, forward the text input information as the generated comment to the media server.

3. The system of claim 1, wherein the processor is further configured to:
   determine whether the received comment-related input from the remote control input device is a voice input containing voice information;
   in response to the determination that the received comment-related input is a voice input containing voice information, translate the voice information from the voice input into representative text, the representative text representing the voice information as text; and
   forward the representative text as the generated comment to the media server for distribution to the electronic device.

4. The system of claim 3, wherein when translating the voice information into the representative text, the processor is further configured to:
   execute a voice-to-text program stored in the memory; and
   as a result of the executed voice-to-text program, output from the executing voice-to-text program representative text corresponding to the voice information.

5. The system of claim 3, wherein when translating the voice information into the representative text, the processor is further configured to:
   transmit the voice information to a network-based text-to-voice service; and
   receive, from the network-based text-to-voice service, representative text corresponding to the voice information.

6. The system of claim 1, wherein the electronic device is further configured to:
   format, prior to sending the generated comment to the media server, the generated comment using extensible markup language (XML), JavaScript object notation (JSON), or other format compatible with the hypertext transfer protocol (HTTP).

7. The system of claim 1, wherein the system further comprises:
   a plurality of other electronic devices coupled to the media server in the network, each of the other electronic devices configured to:
   receive the streaming graphical content and the textual content delivered contemporaneously via the network from the media server.

8. The system of claim 7, wherein each respective one of the plurality of other electronic devices is configured to provide a respective comment based on a respective comment-related input received from a respective remote control coupled to the respective one of the plurality of the other electronic devices.

9. A method for delivering content via a network comprising:
   receiving, by an electronic device, streaming graphical content from a media server;
   presenting, by the electronic device, the streaming graphical content on a display device coupled to the electronic device;
   receiving, by the electronic device, a comment-related input received from a remote control input device coupled to the electronic device;
   in response to receiving the comment-related input, generating, by the electronic device, a comment based on the received input, the comment being generated from a text file;
   sending, by the electronic device, the generated comment to the media server;
   receiving, by the electronic device, textual content based on the generated comment with the streaming graphical content from the media server; and presenting, by the electronic device, the streaming graphical content with the textual content on the display device, the textual content representing the generated comment being presented as text on the display device, wherein the presented textual content is shown as text on the display device contemporaneously with the streaming graphical content.

10. The method of claim 9, further comprising steps of:

determining, by the electronic device, whether the received comment-related input from the remote control input device is a text input containing information represented by text; and in response to the determination indicating the received comment-related input is a text input, forwarding, by the electronic device, the text input information as the generated comment to the media server.

11. The method of claim 9, further comprising steps of:

determining, by the electronic device, whether the received comment-related input from the remote control input device is a voice input containing voice information;

in response to the determination that the received comment-related input is a voice input containing voice information, translating, by the electronic device, the voice information from the voice input into representative text, the representative text representing the voice information as text; and forwarding, by the electronic device, the representative text as the generated comment to the media server.

12. The method of claim 11, wherein translating the voice information into the representative text comprises steps of:

executing a voice-to-text program stored in the memory of the electronic device; and as a result of the executed voice-to-text program, outputting from the execution of the voice-to-text program representative text corresponding to the voice information.

13. The system of claim 11, wherein translating the voice information into the representative text comprises steps of:

transmitting the voice information to a network-based voice-to-text service, wherein the voice information is input into the network-based voice-to-text service; and receiving representative text corresponding to the voice information from the network-based voice-to-text service.

14. The method of claim 9, further comprising steps of:

prior to sending the generated comment to the media server, formatting, by the electronic device, the generated comment by the respective electronic device using extensible markup language (XML), javascript object notation (JSON), or other format compatible with the hypertext transfer protocol (HTTP).

15. The method of claim 9, wherein delivering the textual content with the graphical content to the electronic device further comprises steps of:

delivering the textual content with the graphical content to other electronic devices of a plurality of electronic devices at substantially the same time that the textual content with the graphical content is delivered to the electronic device.

16. A non-transitory tangible machine readable medium in an electronic device embodying instructions to cause a processor to perform functions to deliver content via a network comprising:

receiving streaming graphical content from a media server;

providing the streaming graphical content to a display device for presentation;

receiving a comment-related input from the remote control input device, the comment-related input being related to the presented streaming graphical content;

in response to receiving the comment-related input, generating a comment based on the received comment-related input, the comment being generated from a text file;

sending the generated comment to the media server;

receiving textual content based on the generated comment with the streaming graphical content from the media server; and providing the streaming graphical content and the textual content to the display device for presentation, wherein the presented textual content is shown as text on the display device contemporaneously with the streaming graphical content.

17. The non-transitory tangible machine readable medium of claim 16, further embodying instructions to cause the processor to perform functions comprising:

determining whether the received comment-related input from the remote control input device is a text input containing information represented by text; and in response to the determination indicating the received comment-related input is a text input, forwarding the text input information as the generated comment to the media server.

18. The non-transitory tangible machine readable medium of claim 16, further embodying instructions to cause the processor to perform functions comprising:

determining whether the received comment-related input from the remote control input device is a voice input containing voice information;

in response to the determination that the received comment-related input is a voice input containing voice information, translating the voice information from the voice input into representative text, the representative text representing the voice information as text; and forwarding the representative text as the generated comment to the media server.

* * * * *